(12) United States Patent
Yum et al.

(10) Patent No.: US 8,159,416 B1
(45) Date of Patent: Apr. 17, 2012

(54) SYNTHETIC VISION DYNAMIC FIELD OF VIEW

(75) Inventors: Roger L. Yum, Marion, IA (US); Daniel Y. Chiew, Marion, IA (US); David A. Frank, North Liberty, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1052 days.

(21) Appl. No.: 11/890,534

(22) Filed: Aug. 6, 2007

(51) Int. Cl.
*G09G 5/00* (2006.01)
*G01C 21/00* (2006.01)
*G01C 23/00* (2006.01)

(52) U.S. Cl. ............................ 345/8; 340/980; 340/973

(58) Field of Classification Search .................. 345/7–9; 340/443, 963, 971–983; 701/301, 1–3, 14; 348/148
See application file for complete search history.

(56) References Cited

U.S. PATENT DOCUMENTS 5,448,233 A * 9/1995 Saban et al. .................. 340/963
2002/0149599 A1* 10/2002 Dwyer et al. ................. 345/592
\* cited by examiner

*Primary Examiner* — Kevin M Nguyen
(74) *Attorney, Agent, or Firm* — Donna P. Suchy; Daniel M. Barbieri

(57) ABSTRACT

The present disclosure is directed to a dynamic field of view (FOV) for a synthetic vision system (SVS) scene. The FOV within the SVS scene may switch between a FOV conformal to the real world outside of a vehicle and a wider FOV when beneficial. In an aircraft, for example, generating the SVS scene with the narrower FOV may be optimal during flight, while on the ground a wider FOV may improve situational awareness during taxiing. Determination of the airborne or grounded status of the aircraft may be based on speed, altitude, user input, or a received signal. Although the foregoing has been described within a particular context, the present disclosure is not limited to this scenario and may be applied to any vehicle in any situation where dynamically changing between a narrower FOV and a wider FOV is beneficial.

11 Claims, 9 Drawing Sheets

US 8,159,416 B1

SYNTHETIC VISION DYNAMIC FIELD OF VIEW

FIELD OF THE INVENTION

The present disclosure relates generally to guidance systems and more particularly to synthetic vision systems.

BACKGROUND OF THE INVENTION

Synthetic Vision Systems (SVS) generate and present a realistic and intuitive simulated view (the SVS scene) of the world outside of a vehicle, such as an aircraft, a tank, an automobile, a boat, or a submarine. SVS provide the operators of vehicles, such as the pilots of aircraft, with clear and intuitive means of understanding their operating environment. By providing a clear and intuitive means of understanding an operating environment, SVS contribute to situational awareness. Situational awareness is the mental representation and understanding of objects, environmental conditions, and other situation-specific factors affecting human performance in complex and dynamic tasks. Increasing situational awareness for the operator of a vehicle increases operator performance and reduces operator error.

The SVS scene is typically generated utilizing terrain, obstacle, geo-political, hydrological and other databases. The terrain displayed in the SVS scene is drawn utilizing a fixed field of view (FOV). A FOV is the angular extent of the observable world that is seen at any given moment. The FOV of the SVS scene is drawn to be conformal to the real world. By drawing the SVS scene including a FOV which is conformal to the real world, the operator of a vehicle is able to observe a simulated view of the world outside of a vehicle which would be observable through a window in the vehicle, even when conditions such as hazardous weather obscure visibility or when a window is not available, feasible, or desirable.

SUMMARY OF THE INVENTION

The present disclosure is directed to a dynamic field of view (FOV) within a synthetic vision system (SVS) scene. Rather than merely displaying a fixed FOV conformal to the real world outside of a vehicle, the FOV within the SVS scene switches between a FOV conformal to the real world outside of a vehicle and a wider FOV in situations where this is beneficial. For example, a FOV conformal to the world outside of an aircraft may be optimal during flight, while on the ground the pilot may benefit from a wider FOV for better situational awareness while taxiing. A SVS scene is generated with a first FOV when the aircraft is airborne and a second wider FOV when the aircraft is on the ground. The determination of whether the aircraft is airborne or on the ground may be based on information including, but not limited to, speed detected by a speed sensor, altitude detected by an altitude sensor, input received from a user, and a received signal.

Although the foregoing has been described within the context of including a wider FOV in the SVS scene for an aircraft on the ground than the FOV included in the SVS scene when the aircraft is airborne, the present disclosure is not limited to this scenario. It is to be understood that this may be applied to any vehicle (including, but not limited to, a tank, an automobile, a boat, or a submarine) in any situation where it is desirable to include a wider FOV in the SVS scene than the FOV included in the SVS scene when the situation is not present without departing from the scope of the present disclosure.

The present disclosure provides improved situational awareness for the operation of a vehicle by allowing the display of a SVS scene with a FOV that is wider than the normal FOV conformal to the real world outside of the vehicle when a SVS scene with a wider FOV is beneficial, but a normal FOV conformal to the real world outside of the vehicle when a wider FOV would not be beneficial.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to exemplary embodiments of the disclosure, examples of which are illustrated in the accompanying drawings.

The terrain displayed in a synthetic vision system (SVS) scene is drawn utilizing a fixed field of view (FOV). The FOV is drawn to be conformal to the real world outside of the vehicle. However, it may be beneficial to present a wider FOV in certain situations. For example, a FOV conformal to the world outside of an aircraft may be optimal during flight, while on the ground the pilot may benefit from a wider FOV for better situational awareness while taxiing. Thus, it would be desirable if the SVS scene included a wider FOV when the aircraft was on the ground than the FOV included in the SVS scene when the aircraft was airborne.

Although the following is described within the context of including a wider FOV in the SVS scene for an aircraft on the ground than the FOV included in the SVS scene when the aircraft is airborne, the present disclosure is not limited to this scenario. It is to be understood that this may be applied to any vehicle (including, but not limited to, a tank, an automobile, a boat, or a submarine) in any situation where it is desirable to include a wider FOV in the SVS scene than the FOV included in the SVS scene when the situation is not present without departing from the scope of the present disclosure.

Figure 1:
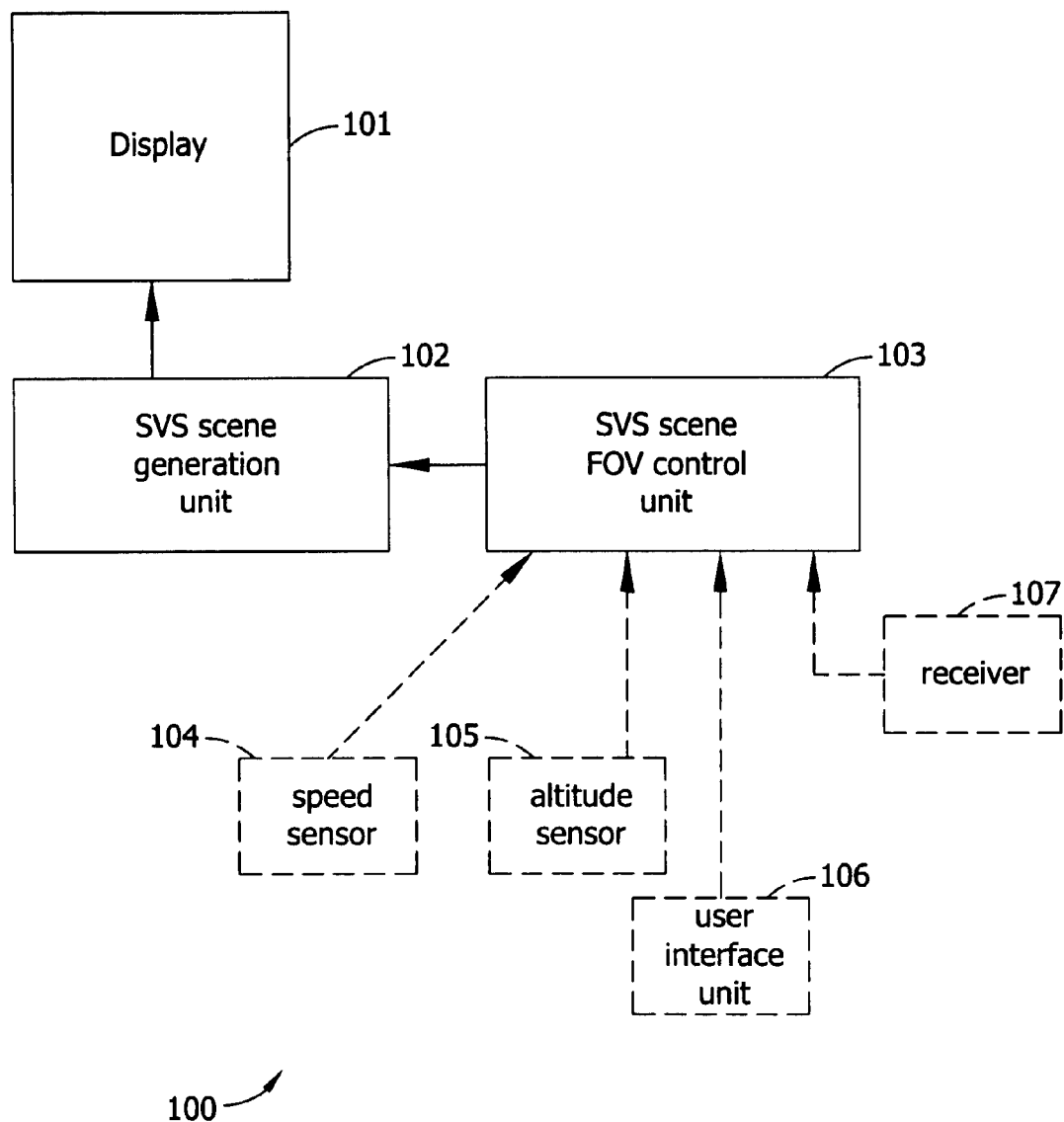
FIG. 1 is a block diagram illustrating a synthetic vision system (SVS) scene displaying apparatus, in accordance with an exemplary embodiment of the present disclosure.

Referring generally to FIG. 1; a SVS scene displaying apparatus 100, in accordance with an exemplary embodiment of the present disclosure, is illustrated. The SVS scene displaying apparatus 100 comprises a display 101, a SVS scene generation unit 102 operably coupled to the display 101, and a SVS scene FOV control unit 103 operably coupled to the SVS scene generation unit 102. The SVS scene displaying apparatus 100 may also comprise a speed sensor 104 operably coupled to the SVS scene FOV control unit 103. The SVS scene displaying apparatus 100 may also comprise an altitude sensor 105 operably coupled to the SVS scene FOV control unit 103. The SVS scene displaying apparatus 100 may also comprise a user interface unit 106 operably coupled to the SVS scene FOV control unit 103. The SVS scene displaying apparatus 100 may also comprise a receiver 107 operably coupled to the SVS scene FOV control unit 103.

The SVS scene generation unit 102 generates a SVS scene. The SVS scene generation unit 102 is operable to generate a SVS scene which includes a first FOV and to generate a SVS scene which includes a second FOV which is wider than the first FOV. The first FOV may comprise a 50° FOV whereas the second FOV may comprise a 75° FOV. The display 101 may display the SVS scene which is generated by the SVS scene generation unit 102. The SVS scene FOV control unit 103 is operable to cause the SVS scene generation unit 102 to generate the SVS scene including the first FOV or the second FOV. For example, when an aircraft which incorporates the SVS scene displaying apparatus 100 is airborne, the SVS scene FOV control unit 103 may cause the SVS scene generation unit 102 to generate the SVS scene including the first FOV. However, when the aircraft is on the ground the SVS scene FOV control unit 103 may cause the SVS scene generation unit 102 to generate the SVS scene including the second FOV. The SVS scene which is then generated by the SVS scene generation unit 102 is then displayed on the display 101.

The SVS scene FOV control unit 103 may control whether the SVS scene generation unit 102 generates the SVS scene including the first FOV or the second FOV based on a speed detected by the speed sensor 104. The speed sensor 104 may measure air speed. In the above example wherein the SVS scene FOV control unit 103 causes the SVS scene generation unit 102 to generate the SVS scene including the first FOV when the aircraft is airborne and the second FOV when the aircraft is on the ground, the SVS scene FOV control unit 103 may treat the aircraft as airborne when the speed is within a first range and on the ground when the speed is within a second range. The first range may comprise the range of speed between a takeoff rotation speed and infinity while the second range may comprise the range of speed between zero and the takeoff rotation speed. Alternatively, the first range may comprise the range of speed between any positive speed and infinity while the second range may comprise the range of speed between zero and any positive speed.

The SVS scene FOV control unit 103 may control whether the SVS scene generation unit 102 generates the SVS scene including the first FOV or the second FOV based on an altitude detected by the altitude sensor 105. In the above example wherein the SVS scene FOV control unit 103 causes the SVS scene generation unit 102 to generate the SVS scene including the first FOV when the aircraft is airborne and the second FOV when the aircraft is on the ground, the SVS scene FOV control unit 103 may treat the aircraft as airborne when the altitude is within a first range and on the ground when the altitude is within a second range. The first range may comprise the range between a takeoff rotation altitude and infinity while the second range may comprise the range between zero and the takeoff rotation altitude. Alternatively, the first range may comprise the range between any positive altitude and infinity while the second range may comprise the range between zero and any positive altitude. The altitude sensor 105 may comprise any sensor for determining altitude including, but not limited to, a barometric altimeter, a radio altimeter, a GPS (global positioning system) sensor, an inertial sensor, and a pressure sensor which registers when the aircraft touches the ground.

The SVS scene FOV control unit 103 may control whether the SVS scene generation unit 102 generates the SVS scene including the first FOV or the second FOV based on input from a user entered via the user interface unit 106. In the above example wherein the SVS scene FOV control unit 103 causes the SVS scene generation unit 102 to generate the SVS scene including the first FOV when the aircraft is airborne and the second FOV when the aircraft is on the ground, the SVS scene FOV control unit 103 may treat the aircraft as airborne in response to a user input provided via the user interface unit 106 and on the ground in response to a user input provided via the user interface unit 106. The user interface unit 106 may comprise any device for receiving input from a user including, but not limited to, a button, a joystick, a keyboard, a microphone, a switch, a touch screen, a knob, a lever, a slider, a keypad, a trackball, and a dial.

The SVS scene FOV control unit 103 may control whether the SVS scene generation unit 102 generates the SVS scene including the first FOV or the second FOV in response to a signal received by the receiver 107. In the above example wherein the SVS scene FOV control unit 103 causes the SVS scene generation unit 102 to generate the SVS scene including the first FOV when the aircraft is airborne and the second FOV when the aircraft is on the ground, the SVS scene FOV control unit 103 may treat the aircraft as airborne in response to a signal received by the receiver 107 and on the ground in response to a signal received by the receiver 107. The signal may be transmitted in order to inform the SVS scene FOV control unit 103 when to switch from the first FOV to the second FOV. For example, a transmitter may be located at a landing area and transmit the signal to inform the SVS scene FOV control unit 103 when the aircraft is close enough to the ground to switch from the first FOV to the second FOV, or far enough away from the ground to switch from the second FOV to the first FOV. The receiver 107 may comprise any kind of receiver including, but not limited to, a radio receiver and a GPS receiver.

Figure 2:
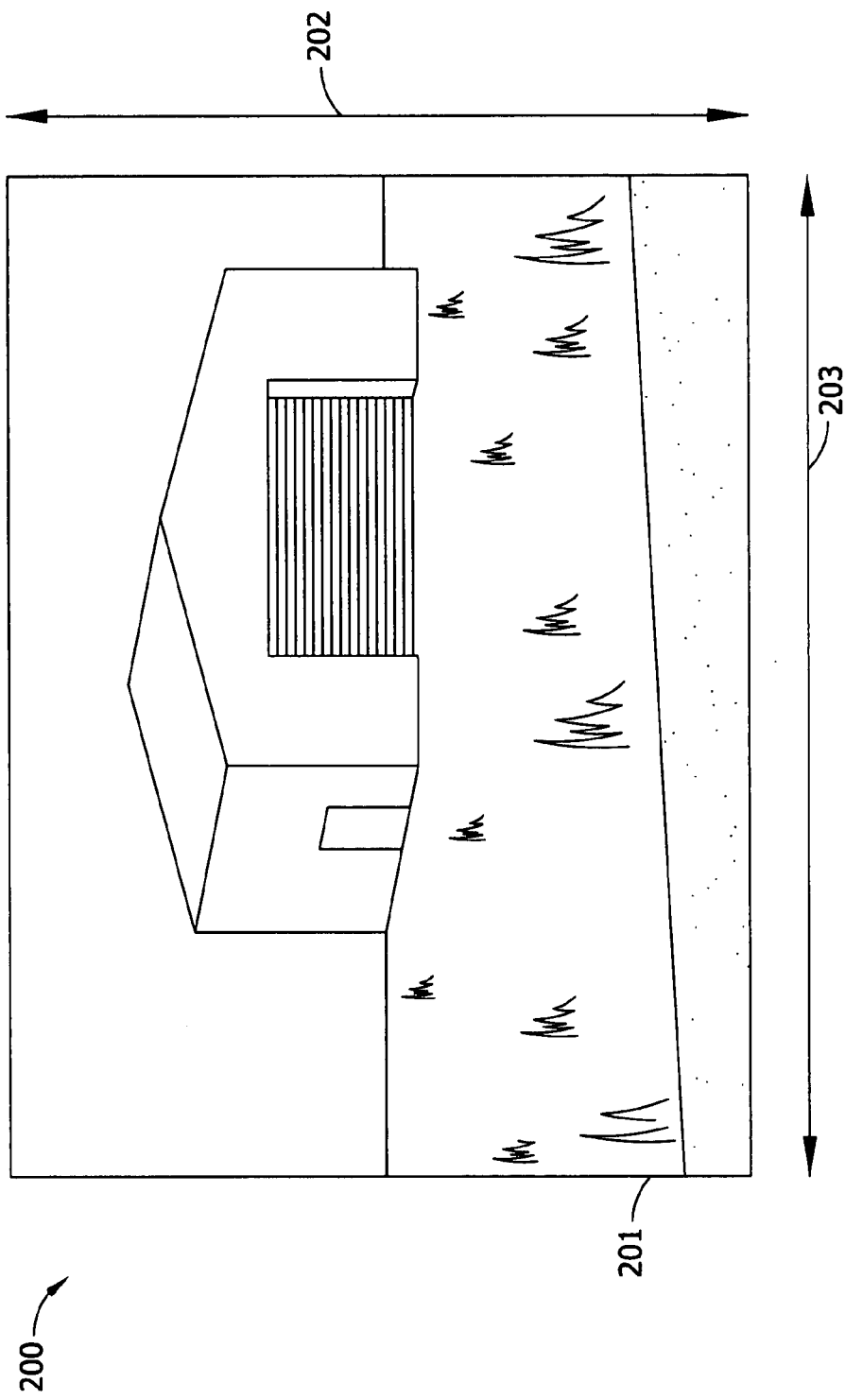
FIG. 2 is a diagram illustrating a SVS scene, in accordance with an exemplary embodiment of the present disclosure.
Figure 3:
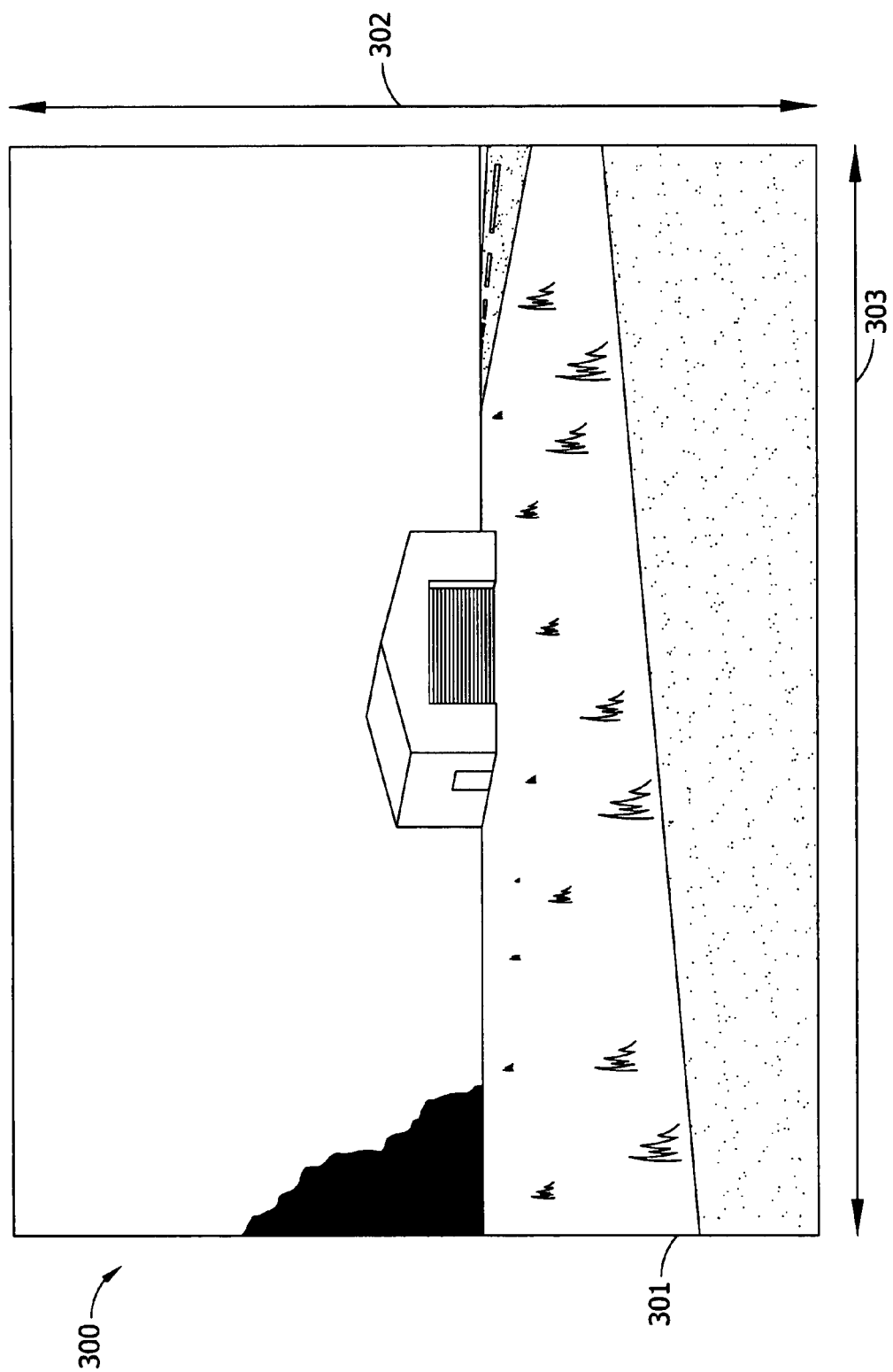
FIG. 3 is a diagram illustrating a SVS scene, in accordance with an exemplary embodiment of the present disclosure.

Referring now to FIG. 2; a SVS scene 200 including a first FOV which may be displayed by the SVS scene displaying apparatus 100, in accordance with an exemplary embodiment of the present invention, is illustrated. The SVS scene 200 may include a vertical dimension 202 and a horizontal dimension 203. Referring now to FIG. 3; a SVS scene 300 including a second FOV which may be displayed by the SVS scene displaying apparatus 100, in accordance with an exemplary embodiment of the present invention, is illustrated. The SVS scene 300 may include a vertical dimension 302 and a horizontal dimension 303. Comparing FIGS. 2 and 3, it can be seen that the second FOV of the SVS scene 300 is wider than the first FOV of the SVS scene 200. A runway is visible in the second FOV of FIG. 3 which is not visible in the first FOV of FIG. 2. As illustrated, the second FOV of the SVS scene 300 is both horizontally and vertically wider than the first FOV of the SVS scene 200. However, the second FOV may merely be wider than the first FOV horizontally or vertically, as well as both horizontally and vertically, without departing from the scope of the present disclosure.

Figure 4:
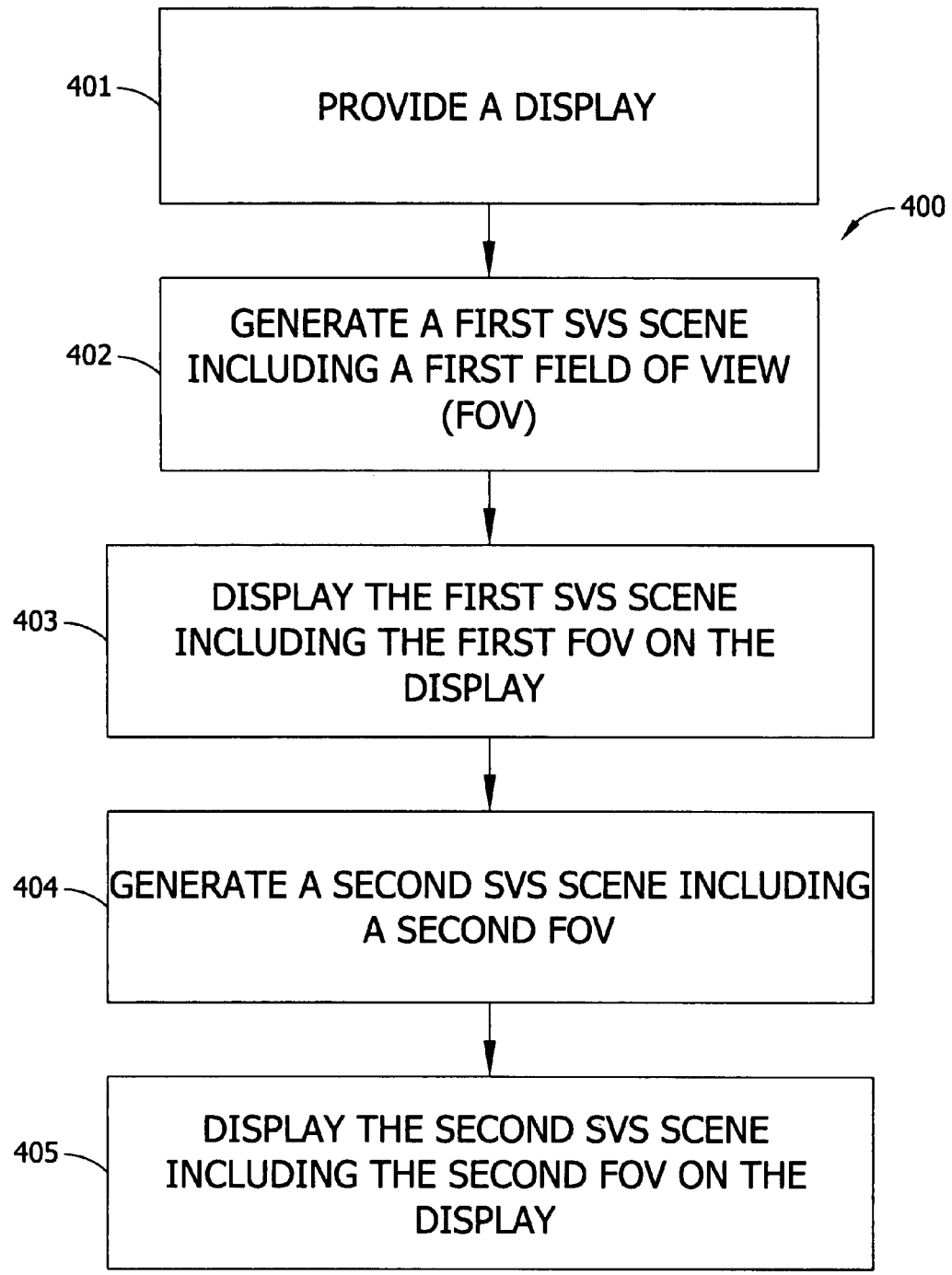
FIG. 4 is a flow chart illustrating a method of displaying a synthetic vision system (SVS) scene, in accordance with an exemplary embodiment of the present disclosure.

Referring now to FIG. 4; a method 400 of displaying a synthetic vision system (SVS) scene, in accordance with an alternative embodiment of the present disclosure, is shown. In step 401, a display is provided. In step 402, a first SVS scene, including a first FOV, is generated. The first FOV may comprise a 50° FOV. In step 403, the first SVS scene, including the first FOV, is displayed on the display. In step 404, a second SVS scene, including a second FOV wherein the second FOV is wider than the first FOV, is generated. The second FOV may comprise a 75° FOV. In step 405, the second SVS scene, including the second FOV, is displayed on the display. The SVS scene may be displayed in a vehicle, such as an aircraft, and the first SVS scene (including the first FOV) may be displayed when the aircraft is airborne while the second SVS scene (including the second FOV) may be displayed when the aircraft is on the ground to improve situational awareness during taxiing.

Figure 5:
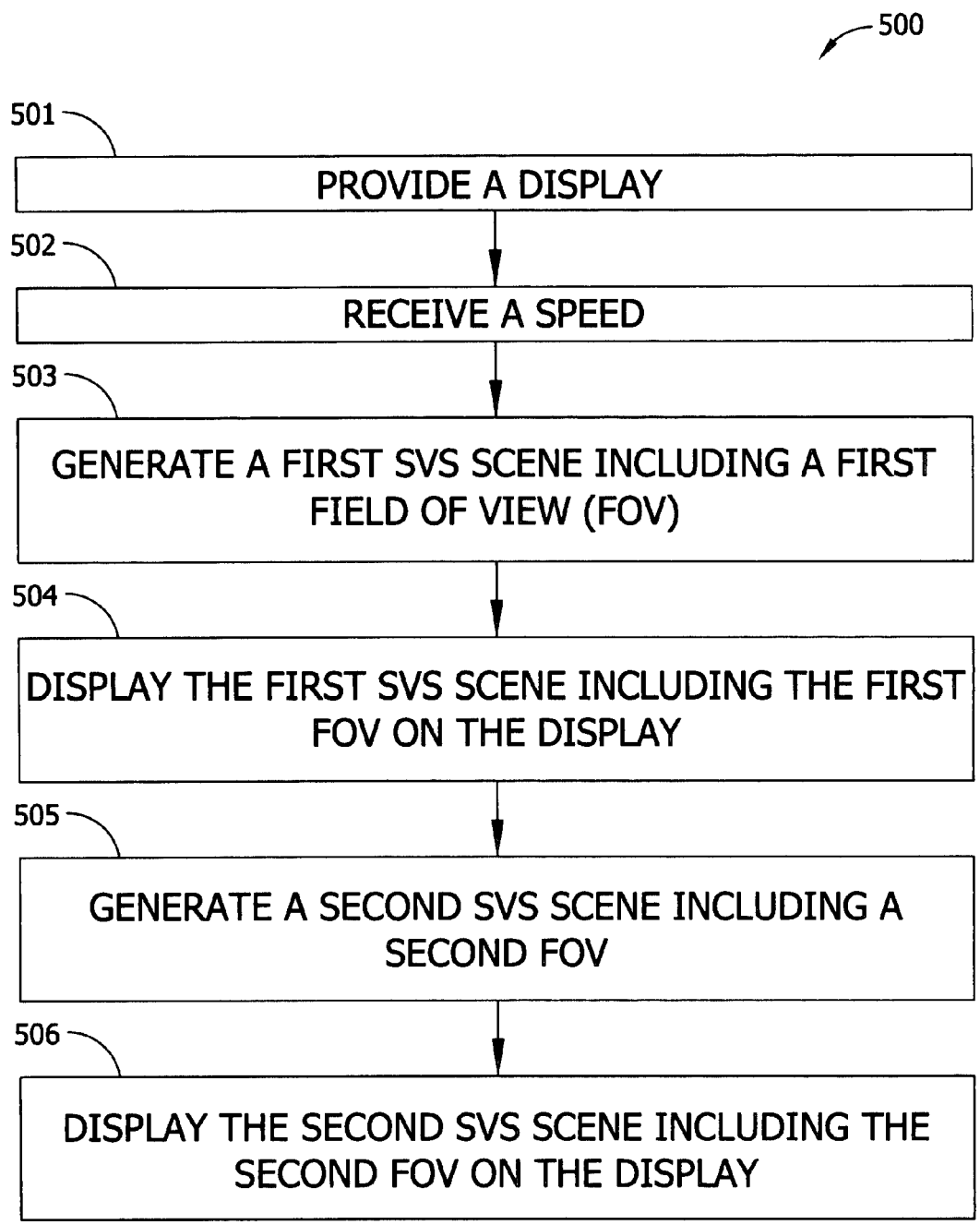
FIG. 5 is a flow chart illustrating a method of displaying a synthetic vision system (SVS) scene, in accordance with an alternative embodiment of the present disclosure.

Referring now to FIG. 5; a method 500 of displaying a synthetic vision system (SVS) scene, in accordance with an alternative embodiment of the present disclosure, is shown. In step 501, a display is provided. In step 502, a speed is received. In step 503, a first SVS scene, including a first FOV, is generated. The first FOV may comprise a 50° FOV. In step 504, the first SVS scene, including the first FOV, is displayed on the display. In step 505, a second SVS scene, including a second FOV wherein the second FOV is wider than the first FOV, is generated. The second FOV may comprise a 75° FOV. In step 506, the second SVS scene, including the second FOV, is displayed on the display. The SVS scene may be displayed in a vehicle, such as an aircraft, and the first SVS scene (including the first FOV) may be displayed when the aircraft is airborne while the second SVS scene (including the second FOV) may be displayed when the aircraft is on the ground to improve situational awareness during taxiing. The aircraft may be considered airborne when the speed is within a first range and on the ground when the speed is within a second range. The first range may comprise the range of speed between a takeoff rotation speed and infinity while the second range may comprise the range of speed between zero and the takeoff rotation speed. Alternatively, the first range may comprise the range of speed between any positive speed and infinity while the second range may comprise the range of speed between zero and any positive speed.

Figure 6:
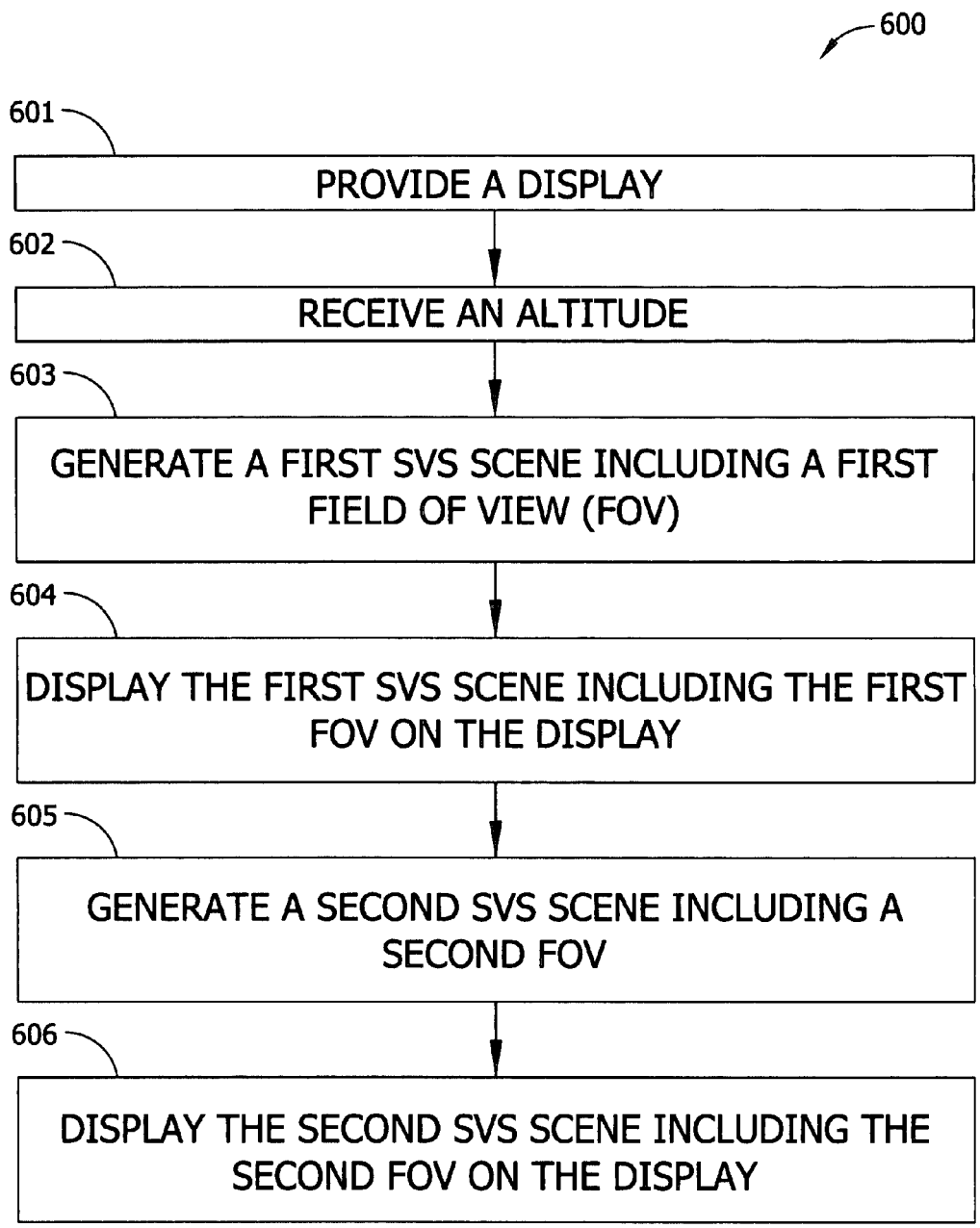
FIG. 6 is a flow chart illustrating a method of displaying a synthetic vision system (SVS) scene, in accordance with an alternative embodiment of the present disclosure.

Referring now to FIG. 6; a method 600 of displaying a synthetic vision system (SVS) scene, in accordance with an alternative embodiment of the present disclosure, is shown. In step 601, a display is provided. In step 602, an altitude is received. In step 603, a first SVS scene, including a first FOV, is generated. The first FOV may comprise a 50° FOV. In step 604, the first SVS scene, including the first FOV, is displayed on the display. In step 605, a second SVS scene, including a second FOV wherein the second FOV is wider than the first FOV, is generated. The second FOV may comprise a 75° FOV. In step 606, the second SVS scene, including the second FOV, is displayed on the display. The SVS scene may be displayed in a vehicle, such as an aircraft, and the first SVS scene (including the first FOV) may be displayed when the aircraft is airborne while the second SVS scene (including the second FOV) may be displayed when the aircraft is on the ground to improve situational awareness during taxiing. The aircraft may be considered airborne when the altitude is within a first range and on the ground when the altitude is within a second range. The first range may comprise the range between a takeoff rotation altitude and infinity while the second range may comprise the range between zero and the takeoff rotation altitude. Alternatively, the first range may comprise the range between any positive altitude and infinity while the second range may comprise the range between zero and any positive altitude.

Figure 7:
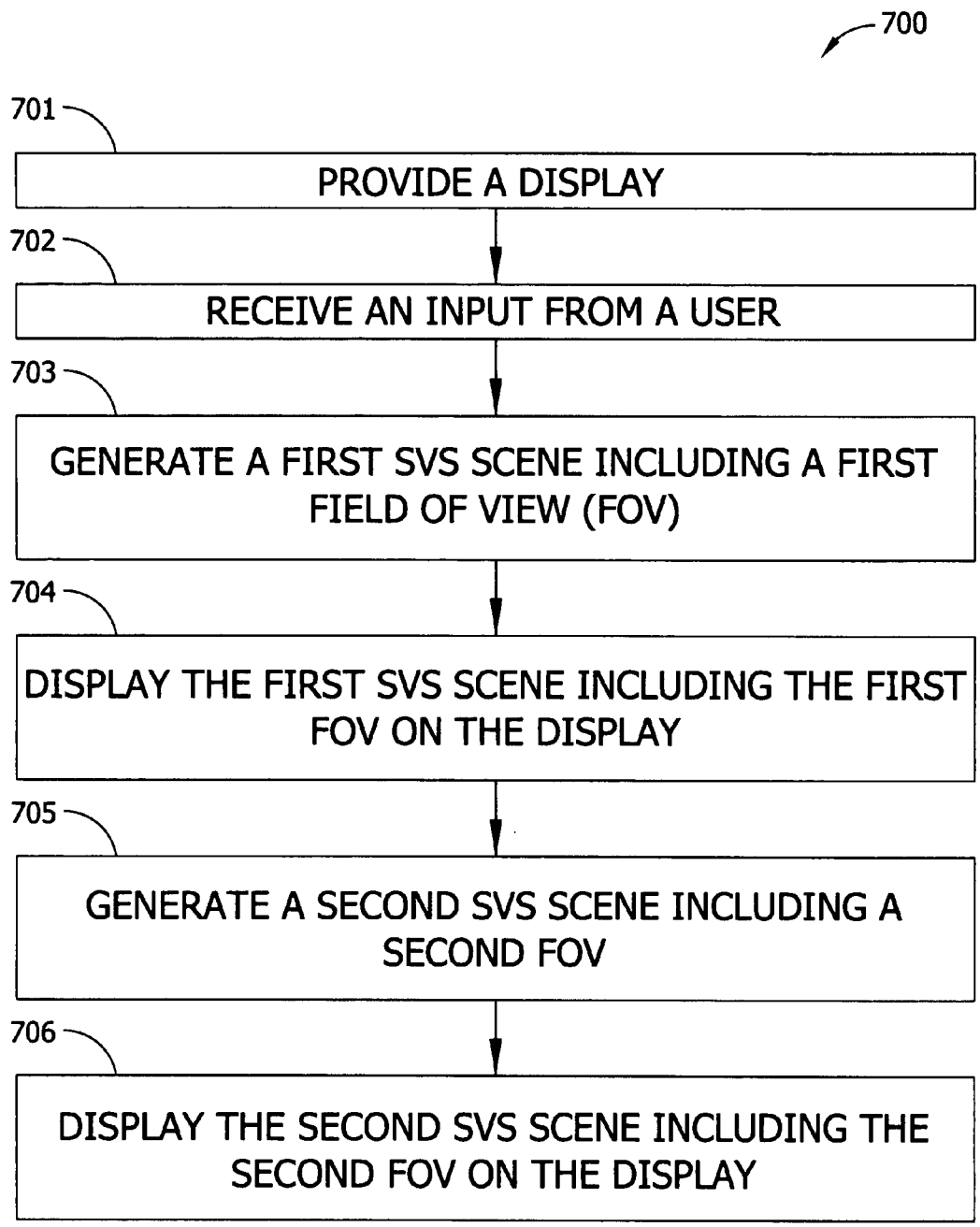
FIG. 7 is a flow chart illustrating a method of displaying a synthetic vision system (SVS) scene, in accordance with an alternative embodiment of the present disclosure.

Referring now to FIG. 7; a method 700 of displaying a synthetic vision system (SVS) scene, in accordance with an alternative embodiment of the present disclosure, is shown. In step 701, a display is provided. In step 702, an input from a user is received. In step 703, a first SVS scene, including a first FOV, is generated. The first FOV may comprise a 50° FOV. In step 704, the first SVS scene, including the first FOV, is displayed on the display. In step 705, a second SVS scene, including a second FOV wherein the second FOV is wider than the first FOV, is generated. The second FOV may comprise a 75° FOV. In step 706, the second SVS scene, including the second FOV, is displayed on the display. The SVS scene may be displayed in a vehicle, such as an aircraft, and the first SVS scene (including the first FOV) may be displayed when the aircraft is airborne while the second SVS scene (including the second FOV) may be displayed when the aircraft is on the ground to improve situational awareness during taxiing. The aircraft may be considered airborne in response to a user input and on the ground in response to a user input.

Figure 8:
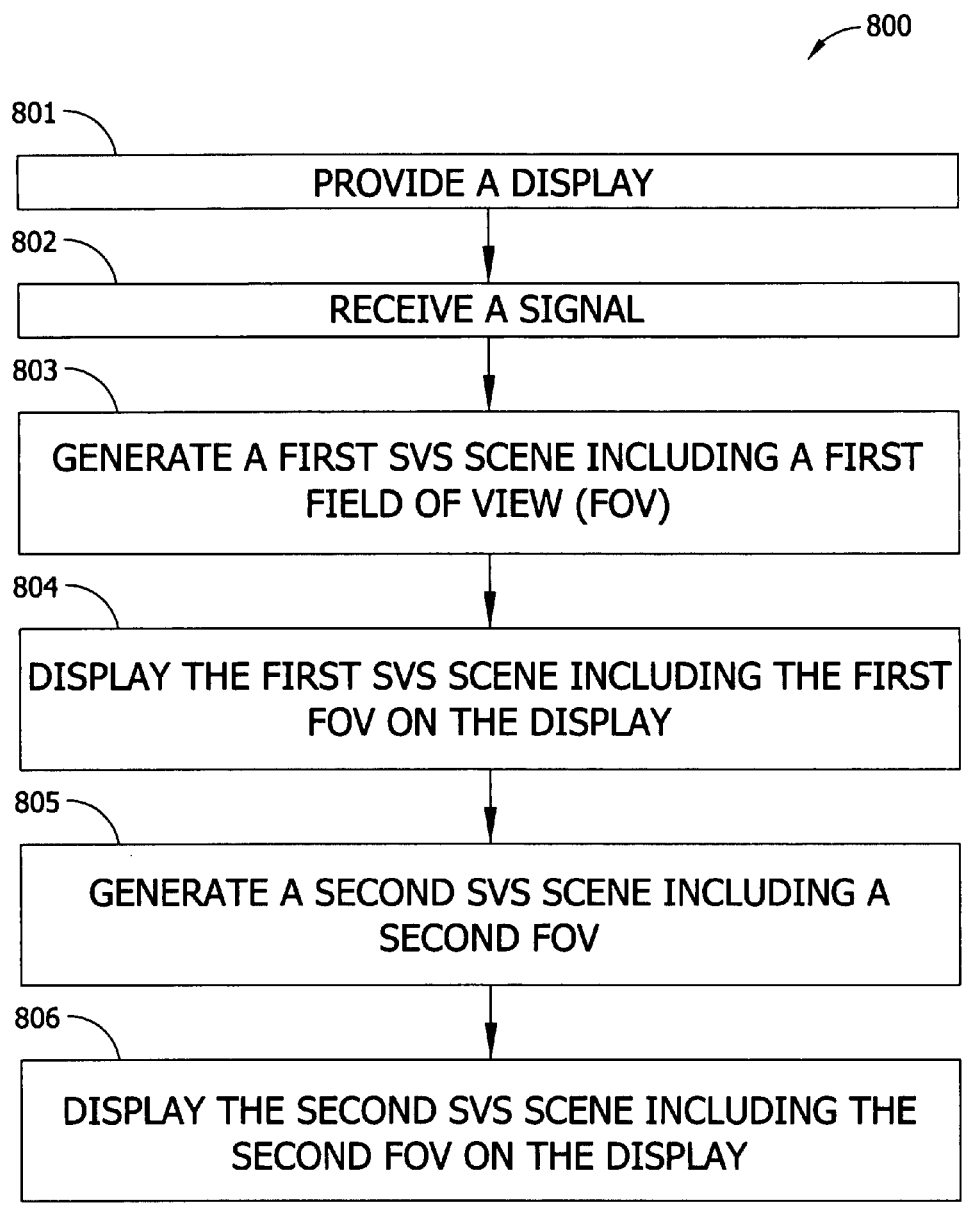
FIG. 8 is a flow chart illustrating a method of displaying a synthetic vision system (SVS) scene, in accordance with an alternative embodiment of the present disclosure.

Referring now to FIG. 8; a method 800 of displaying a synthetic vision system (SVS) scene, in accordance with an alternative embodiment of the present disclosure, is shown. In step 801, a display is provided. In step 802, a signal is received. In step 803, a first SVS scene, including a first FOV, is generated. The first FOV may comprise a 50° FOV. In step 804, the first SVS scene, including the first FOV, is displayed on the display. In step 805, a second SVS scene, including a second FOV wherein the second FOV is wider than the first FOV, is generated. The second FOV may comprise a 75° FOV. In step 806, the second SVS scene, including the second FOV, is displayed on the display. The SVS scene may be displayed in a vehicle, such as an aircraft, and the first SVS scene (including the first FOV) may be displayed when the aircraft is airborne while the second SVS scene (including the second FOV) may be displayed when the aircraft is on the ground to improve situational awareness during taxiing. The aircraft may be considered airborne in response to the received signal or on the ground in response to the received signal. The signal may be transmitted in order to inform when to switch from the first FOV to the second FOV. For example, a transmitter may be located at a landing area and transmit the signal to inform the aircraft when it is close enough to the ground to switch from the first FOV to the second FOV, or far enough away from the ground to switch from the second FOV to the first FOV.

Although the present disclosure has been described in the context of a SVS scene displayed on a display for a SVS, the present disclosure is not limited to this scenario. It is to be understood that the present disclosure can be applied to any scene for any kind of display without departing from the scope of the present disclosure.

Figure 9:
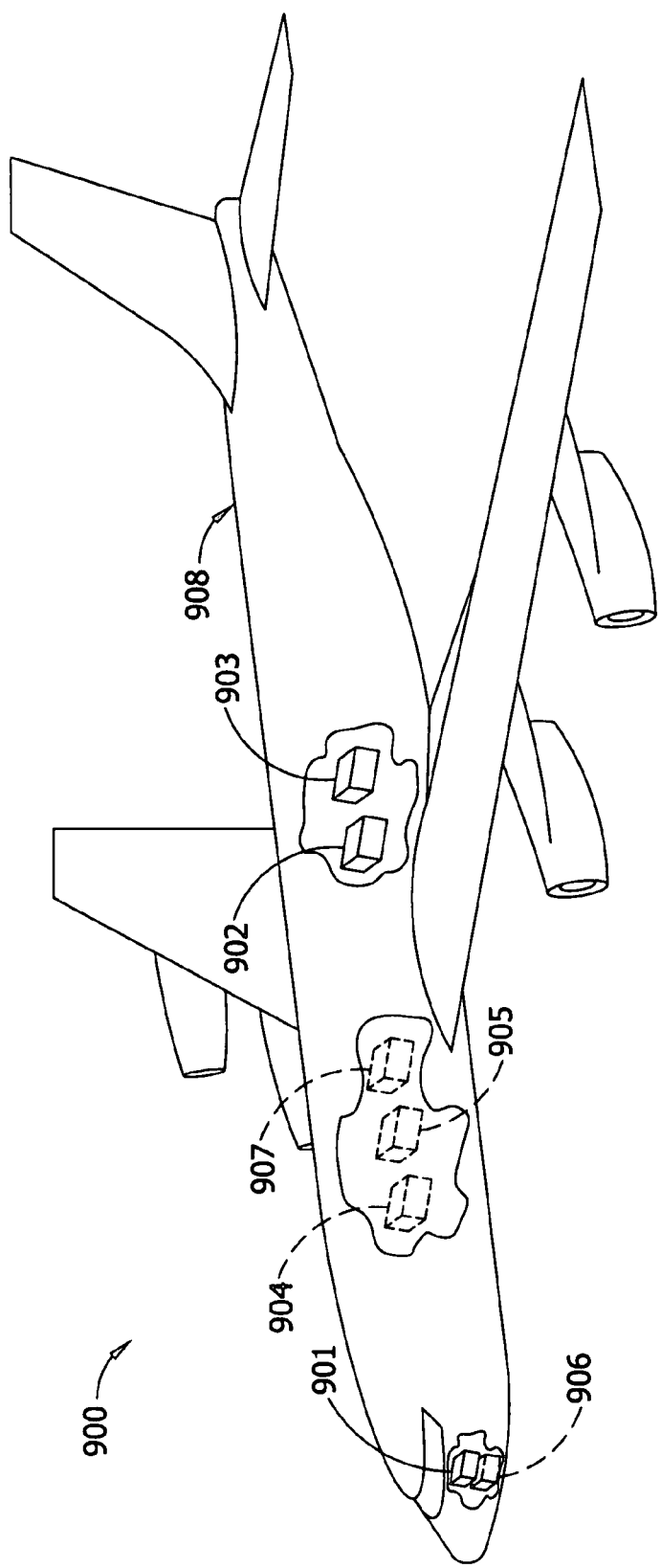
FIG. 9 is a diagram illustrating a system for displaying a synthetic vision system (SVS) scene for a vehicle, in accordance with an alternative embodiment of the present disclosure.

Referring now to FIG. 9, a system 900 for displaying a scene for a vehicle, in accordance with an alternative embodiment of the present disclosure, is shown. The system 900 includes a vehicle 908, a display 901, a scene generation component 902, and a scene FOV control component 903. Vehicle 908 is illustrated as an aircraft. However, vehicle 908 may comprise any other kind of vehicle including, but not limited to a tank, an automobile, a boat, or a submarine without departing from the scope of the present disclosure.

The system 900 may also include a speed sensor 904, an altitude sensor 905, a user interface unit 906, and/or a receiver 907. The display 901 may be incorporated into a SVS and the scene may comprise a SVS scene.

The scene generation component 902 generates a scene. The scene generation component 902 is operable to generate a scene which includes a first FOV and to generate a scene which includes a second FOV, which is wider than the first FOV. The first FOV may comprise a 50° FOV whereas the second FOV may comprise a 75° FOV. The display 901 may display the scene which is generated by the scene generation component 902. The scene FOV control component 903 is operable to cause the scene generation component 902 to generate the scene including the first FOV or the second FOV. For example, if the vehicle 908 comprises an aircraft, when the aircraft 908 is airborne, the scene FOV control component 903 may cause the scene generation component 902 to generate the scene including the first FOV. However, when the aircraft 908 is on the ground, the scene FOV control component 903 may cause the scene generation component 902 to generate the scene including the second FOV. The scene which is then generated by the scene generation component 902 is then displayed on the display 901.

The scene FOV control component 903 may treat aircraft 908 as airborne or on the ground based on a speed detected by the speed sensor 904. The scene FOV control component 903 may treat the aircraft as airborne when the speed is within a first range and on the ground when the speed is within a second range. The scene FOV control component 903 may treat aircraft 908 as airborne or on the ground based on an altitude detected by the altitude sensor 905. The scene FOV control component 903 may treat the aircraft as airborne when the altitude is within a first range and on the ground when the altitude is within a second range. The scene FOV control component 903 may treat aircraft 908 as airborne or on the ground based on input from a user entered via the user interface component 906. The scene FOV control component 903 may treat the aircraft as airborne when the user instructs the scene FOV control component 903 via the user interface component 906 that the aircraft is airborne and on the ground when the when the user instructs the scene FOV control component 903 via the user interface component 906 that the aircraft is on the ground. The scene FOV control component 903 may treat the aircraft as airborne in response to a signal received by the receiver 907 and on the ground in response to a signal received by the receiver 907.

The present disclosure provides improved situational awareness for the operation of a vehicle by allowing the display of a SVS scene with a FOV that is wider than the normal FOV conformal to the real world outside of the vehicle when a SVS scene with a wider FOV is beneficial, but a normal FOV conformal to the real world outside of the vehicle when a wider FOV would not be beneficial.

Although the foregoing has been described within the context of including a wider FOV in the SVS scene for an aircraft on the ground than the FOV included in the SVS scene when the aircraft is airborne, the present disclosure is not limited to this scenario. It is to be understood that this may be applied to any vehicle (including, but not limited to, a tank, an automobile, a boat, or a submarine) in any situation where it is desirable to include a wider FOV in the SVS scene than the FOV included in the SVS scene when the situation is not present without departing from the scope of the present disclosure.

It is understood that the present invention is not limited to any underlying implementing technology. The present invention may be implemented utilizing any combination of software and hardware technology. The present invention may be implemented using a variety of technologies without departing from the scope and spirit of the invention or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A synthetic vision system (SVS) scene displaying apparatus, comprising:
   a SVS scene generation unit, the SVS scene generation unit being configured for generating a first SVS scene including a first field of view (FOV) and a second SVS scene including a second FOV, the first FOV having at least one of: a wider horizontal dimension and a wider vertical dimension than the second FOV;
   a display, the display being operably coupled to the SVS scene generation unit, the display being configured for displaying an SVS scene generated by the SVS scene generation unit; and
   a SVS scene field of view (FOV) control unit, operably coupled to the SVS scene generation unit, the SVS scene FOV control unit being configured for selectively causing the SVS scene generation unit to generate either the first SVS scene including the first FOV or the second SVS scene including the second FOV.

2. The synthetic vision system (SVS) scene displaying apparatus as claimed in claim 1, further including a speed sensor operably coupled to the SVS scene FOV control unit wherein the SVS scene FOV control unit causes the SVS scene generation unit to generate the first SVS scene including the first FOV when a first speed range is detected by the speed sensor and the SVS scene FOV control unit causes the SVS scene generation unit to generate the second SVS scene including the second FOV when a second speed range is detected by the speed sensor.

3. The synthetic vision system (SVS) scene displaying apparatus as claimed in claim 1, further including an altitude sensor operably coupled to the SVS scene FOV control unit wherein the SVS scene FOV control unit causes the SVS scene generation unit to generate the first SVS scene including the first FOV when a first altitude range is detected by the altitude sensor and the SVS scene FOV control unit causes the SVS scene generation unit to generate the second SVS scene including the second FOV when a second altitude range is detected by the altitude sensor.

4. The synthetic vision system (SVS) scene displaying apparatus as claimed in claim 1, further including a user interface unit operably coupled to the SVS scene FOV control unit wherein the SVS scene FOV control unit causes the SVS scene generation unit to selectively generate either the first SVS scene including the first FOV or the second SVS scene including the second FOV in response to a user input provided via the user interface unit.

5. The synthetic vision system (SVS) scene displaying apparatus as claimed in claim 1, further including a receiver operably coupled to the SVS scene FOV control unit wherein the SVS scene FOV control unit causes the SVS scene generation unit to selectively generate either the first SVS scene including the first FOV or the second SVS scene including the second FOV in response to a signal received by the receiver.

6. A method of displaying a synthetic vision system (SVS) scene via a synthetic vision system (SVS) scene displaying apparatus for a vehicle, comprising the steps of:
receiving at least one of: a sensor-provided signal, a user input, and a receiver-provided signal via the apparatus;
based upon the received at least one of sensor data, user input and receiver-provided signal, providing an electronic signal from a SVS scene field of view (FOV) control unit of the apparatus to a SVS scene generation unit of the apparatus for selectively causing the SVS scene generation unit to generate either a first SVS scene including a first field of view (FOV) or a second SVS scene including a second field of view (FOV), the first FOV having at least one of: a wider horizontal dimension and a wider vertical dimension than the second FOV;
in response to the electronic signal provided by the SVS scene FOV control unit, generating, via the SVS scene generation unit, either the first SVS scene including the first FOV or the second SVS scene including the second FOV;
providing the generated SVS scene from the SVS scene generation unit to a display of apparatus; and
displaying the generated SVS scene via the display.

7. A method as claimed in claim 6, further comprising:
when a sensor-provided signal is received and the sensor-provided signal includes a speed, generating either the first SVS scene including the first FOV or the second SVS scene including the second FOV based upon whether the speed is included within a first range of speeds or a second range of speeds.

8. A method as claimed in claim 6, further comprising:
when a sensor-provided signal is received and the sensor-provided signal includes an altitude, generating either the first SVS scene including the first FOV or the second SVS scene including the second FOV based upon whether the altitude is included within a first range of altitudes or a second range of altitudes.

9. A computer program product, comprising:
a non-transitory signal-bearing medium bearing one or more instructions for performing a method for displaying a synthetic vision system (SVS) scene via a synthetic vision system (SVS) scene displaying apparatus for a vehicle, said method comprising:
receiving at least one of: a sensor-provided signal, a user input, and a receiver-provided signal via the apparatus;
based upon the received at least one of sensor data, user input and receiver-provided signal, providing an electronic signal from a SVS scene field of view (FOV) control unit of the apparatus to a SVS scene generation unit of the apparatus for selectively causing the SVS scene generation unit to generate either a first SVS scene including a first field of view (FOV) or a second SVS scene including a second field of view (FOV), the first FOV having at least one of: a wider horizontal dimension and a wider vertical dimension than the second FOV;
in response to the electronic signal provided by the SVS scene FOV control unit, generating, via the SVS scene generation unit, either the first SVS scene including the first FOV or the second SVS scene including the second FOV;
providing the generated SVS scene from the SVS scene generation unit to a display of apparatus; and
displaying the generated SVS scene via the display.

10. A computer program product as claimed in claim 9, said method further comprising:
when a sensor-provided signal is received and the sensor-provided signal includes a speed, generating either the first SVS scene including the first FOV or the second SVS scene including the second FOV based upon whether the speed is included within a first range of speeds or a second range of speeds.

11. A computer program product as claimed in claim 9, said method further comprising:
when a sensor-provided signal is received and the sensor-provided signal includes an altitude, generating either the first SVS scene including the first FOV or the second SVS scene including the second FOV based upon whether the altitude is included within a first range of altitudes or a second range of altitudes.

* * * * *